Sept. 22, 1931.   W. FERRIS   1,823,975
BROACHING MACHINE
Filed March 17, 1922   6 Sheets-Sheet 2

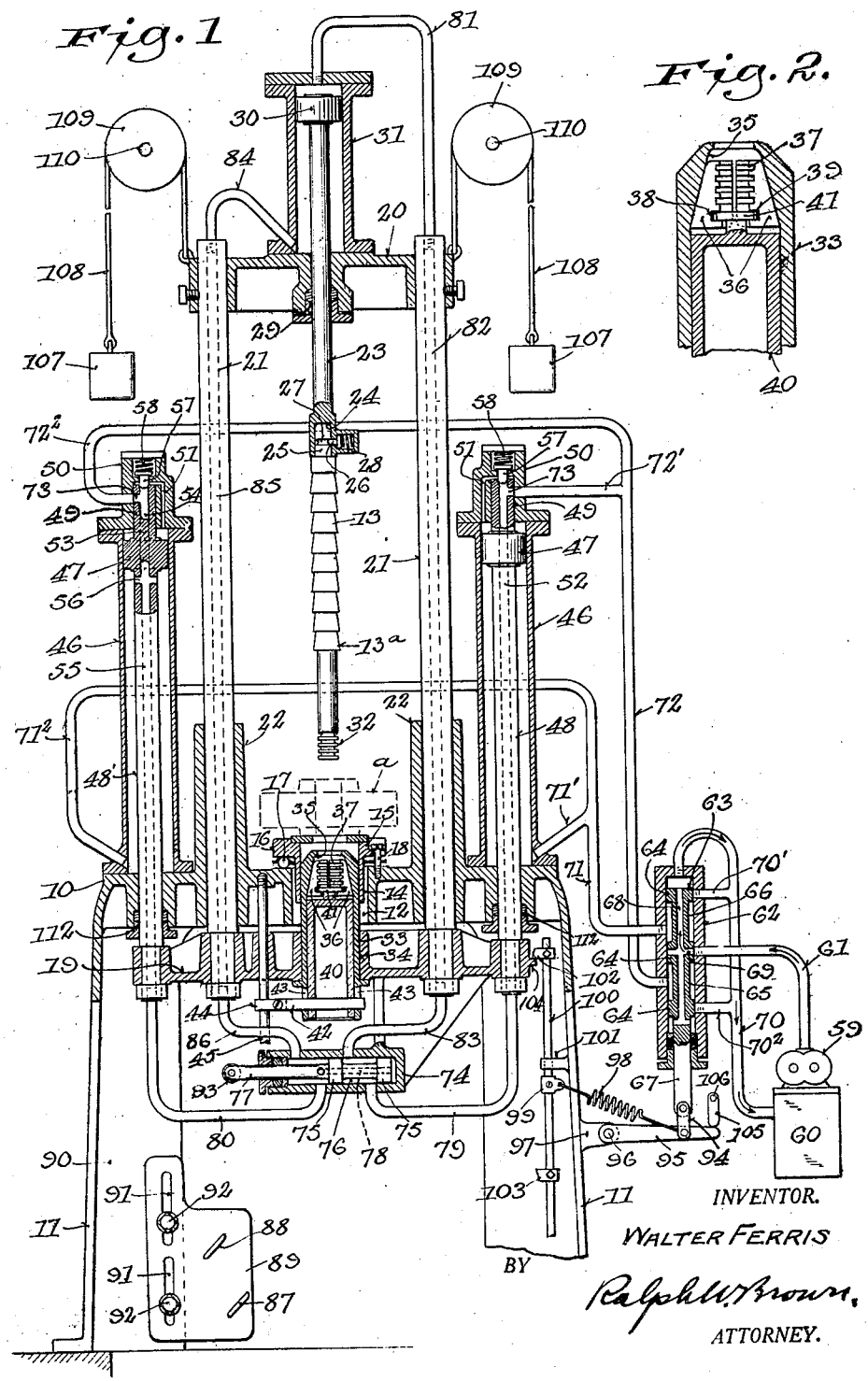

INVENTOR.
WALTER FERRIS
BY Ralph W. Brown.
ATTORNEY.

Sept. 22, 1931.  W. FERRIS  1,823,975
BROACHING MACHINE
Filed March 17, 1922  6 Sheets-Sheet 4

INVENTOR.
WALTER FERRIS
BY
Ralph W. Brown.
ATTORNEY.

Sept. 22, 1931.  W. FERRIS  1,823,975

BROACHING MACHINE

Filed March 17, 1922  6 Sheets-Sheet 5

INVENTOR.
WALTER FERRIS
BY Ralph W. Brown.
ATTORNEY.

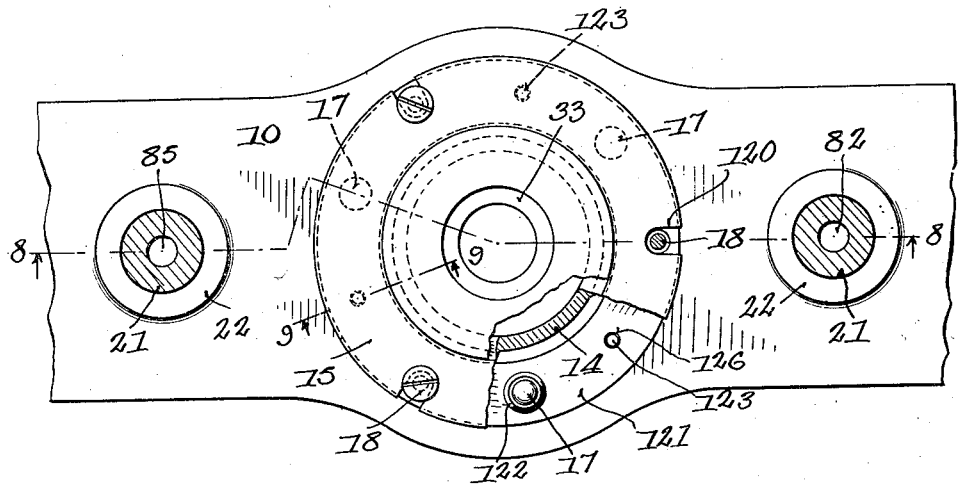
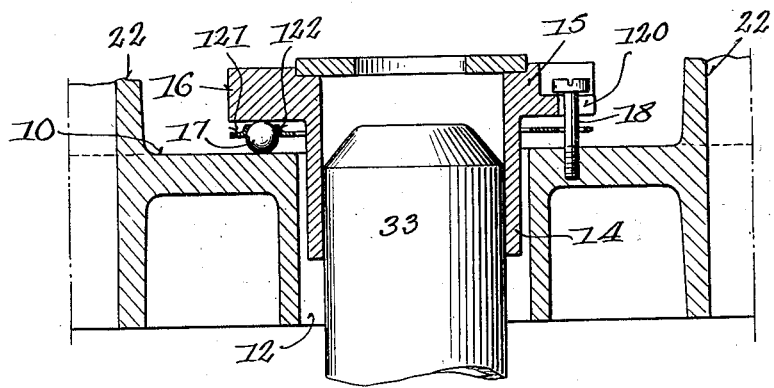
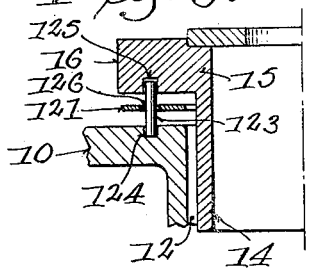

Patented Sept. 22, 1931

1,823,975

UNITED STATES PATENT OFFICE

WALTER FERRIS, OF MILWAUKEE, WISCONSIN, ASSIGNOR TO THE OILGEAR COMPANY, OF MILWAUKEE, WISCONSIN, A CORPORATION OF WISCONSIN

BROACHING MACHINE

Application filed March 17, 1922. Serial No. 544,534.

This invention relates to broaching machines.

The broaching machine to which the invention applies in particular has a face plate for supporting the work during the broaching operation, a tool head for engaging a broaching tool, and power means for reciprocating the tool head to pass the broaching tool through the face plate and through the work supported thereon.

The prior broaching machines had the tool head arranged between the face plate and the power means so that the extended length of the machine was more than three times the length of the broaching tool, and the tool was engaged at one end only so that the force which could be applied to the tool was limited by the tensile strength of the tool when it was pulled through the work and by the tendency of the tool to buckle or bend when it was pushed through the work.

An object of this invention is to provide a broaching machine which is compact and efficient.

Another object is to provide a broaching machine which is substantially one third shorter than the prior machines.

Another object is to provide a vertical broaching machine in which a full length broaching tool is employed.

Another object is to provide a broaching machine in which the tool is both pushed and pulled through the work and thereby allow a greater force to be applied to the tool than was heretofore possible.

Another object is to provide clear loading and unloading gaps for the free insertion of work against the face plate and the removal of the work therefrom.

One embodiment of this invention is diagrammatically illustrated in the accompanying drawings, in which:

Figure 1 is a vertical sectional view diagrammatically illustrating a broaching machine constructed in accordance with the present invention and designed to carry out the novel methods hereinabove mentioned.

Figure 2 is a sectional view on a somewhat larger scale illustrating a tool holder employed in the machine of Figure 1.

Figure 7 is a fragmentary plan view of the bed of the machine, on a somewhat larger scale, illustrating a form of work table employed.

Figure 8 is a sectional view taken substantially on the line 8—8 of Figure 7.

Figure 9 is a sectional view taken substantially on the line 9—9 of Figure 7.

Figure 3:
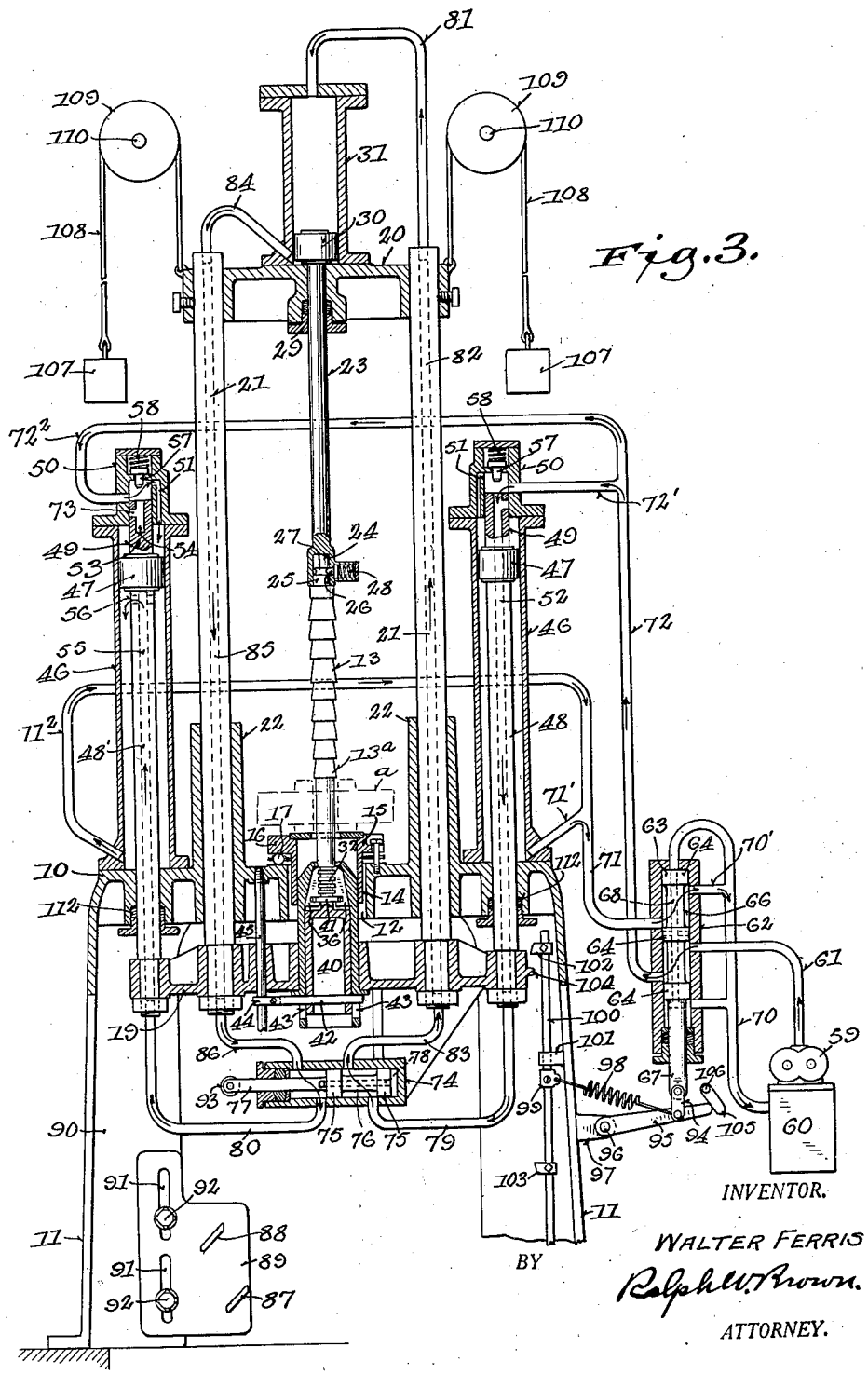
Figures 3 to 6 are views similar to Figure 1 respectively illustrating different positions assumed by the various parts of the machine during a complete cycle of operations.

The broaching machine selected for illustration includes a main supporting frame having a bed plate 10 mounted upon legs 11 securely fixed to the floor or to a foundation of any appropriate form. The bed plate 10 is provided with an opening 12 intermediate the ends thereof to permit the passage of the broaching tool 13 therethrough and preferably of a size to loosely receive the reduced end 14 of the footing block or work support 15 to be hereinafter described.

The broaching tool 13 is carried by a reciprocating frame, preferably such as will now be described. The frame shown comprises a pair of cross-heads 19 and 20 rigidly connected by a pair of parallel connecting rods 21, preferably of hollow construction, for a purpose which will later appear. Rods 21 are mounted for longitudinal reciprocation in appropriate guides 22 carried by the bed plate 10, and disposed on opposite sides of the footing block 15. One of the cross-heads 19 is disposed below the bed plate 10 and is permanently fixed to the ends of the rods 21 while the other cross-head 20 is disposed above the bed plate and is preferably adjustably fixed to the rods 21 to provide a longitudinal adjustment of the tool carrying frame and thus permit the frame to be accommodated to tools of different lengths.

The upper cross-head 20 serves to push the tool through the work and in the machine shown is provided with a plunger 23, having a socket 24 carried by the lower end thereof adapted to receive the upper end or tail 25 of the tool. The socket 24 is provided with a suitable latch mechanism, such, for instance, as a spring pressed pin 26, engageable in an annular groove 27 formed in the end of the tool, for yieldably retaining the tool in the socket. The tension of the spring 28 is such that a force somewhat greater than the weight of the tool is required to withdraw the tool from the socket. The plunger 23 extends upwardly through a stuffing box 29 formed in the upper cross-head and is connected at its upper end to a piston 30, reciprocally mounted in a cylinder 31, fixed to the cross-head intermediate the ends thereof.

The lower cross-head 19 serves to assist in forcing the tool through the work by a pulling action, and to this end is provided with a tool holder or chuck capable of securing a releasable but positive grip on the lower end or nose 32 of the tool. In the machine shown, the tool holder for this purpose includes a sleeve 33 fixed within an opening 34 extending through the cross-head 19 intermediate the ends thereof. This sleeve is provided at its upper end with inwardly inclined inner walls 35 forming substantially conical surfaces adapted to bear against the inclined outer walls of a series of radially arranged chuck jaws 36 mounted within the sleeve. The gripping faces of these jaws are preferably grooved, as at 37, so as to effect an interlocking connection with the grooved end or nose 32 of the tool when forced inwardly to gripping position. A spring 38 in the form of an expansible ring seated in a peripheral groove 39 formed in the chuck jaws 36 tends at all times to force the jaws outwardly against the inner walls of the sleeve 33. A cylinder 40, reciprocally mounted within the sleeve 33, is permanently connected with the jaws 36 by any appropriate means, such as a centrally disposed head 41, carried by the end of the cylinder and engaging in the groove 39 of the jaws. Thus it will be seen that when the cylinder is forced upwardly in the sleeve 33, the jaws 36 are forced upwardly against the conical internal surfaces 35 and are forced inwardly thereby to effect a positive grip on the tool. A downward movement of the cylinder in the sleeve effects a downward movement of the jaws permitting the jaws to be forced outwardly to tool releasing position under the action of the spring 38. The cylinder 40 is limited in its movements by a bar 42 carried by the lower end thereof and projecting through slots 43 formed in the walls of the sleeve 33. This bar also serves to actuate the cylinder 40 and for this purpose is provided at one end with a clamp 44 for effecting a friction grip upon a rod 45 secured to and depending from the bed plate 10. Thus, when the cross-head 19 carrying the sleeve 33 begins a downward movement, the cylinder 40 is yieldably restrained by the friction grip between the bar 42 and fixed rod 45 so that the cylinder 40 is forced upwardly with respect to the sleeve 33, and the jaws 36 are closed toward tool gripping position, and when the cross-head 19 begins an upward movement, relative movement in an opposite direction is effected between the cylinder and sleeve, with the result that the jaws 36 are opened.

The lower cross-head 19, together with the entire tool carrying frame, may be actuated by any appropriate means. In the machine shown hydraulic apparatus is employed for this purpose. This apparatus includes a pair of cylinders 46 secured in upright position upon the ends of the bed plate 10 and enclosing pistons 47, connected to the ends of the cross-head 19 by piston rods 48 and 48'. Each piston rod extends above the piston, as indicated at 49, and each cylinder head 50 is bored to provide a close fit with each extended portion 49, ducts 51 being provided in each cylinder head to effect communication between the clearance spaces above the upper end of the piston rod and the upper side of piston, respectively. Each piston rod is of hollow construction, rod 48 having a clear passage 52 throughout the length thereof to permit flow of the actuating fluid therethrough. The opening through the piston rod 48' is blocked, however, by a plug 53 inserted therein so as to form two non-communicating passages 54 and 55 in the upper and lower portions thereof. Passage 55 is in constant communication with the space below the piston 47 through radial ducts 56 formed in the piston rod. When the pistons 47 are in their uppermost position, the upper end of each of the passages 52 and 54 is normally closed by a valve 57 for a purpose which will later appear. Each valve is mounted for vertical reciprocation in the cylinder head and each is yieldably retained in its lowermost position by a spring 58.

In the machine shown, the pistons 47, as well as the piston 30, are actuated and controlled by an hydraulic circuit which will now be described. This circuit includes a pump 59 of any standard or approved construction, arranged to lift the fluid from a sump 60 and force it under pressure through a feed pipe 61. A primary valve mechanism of any appropriate type controls the flow of fluid from the pipe 61 to and from the machine and back to the sump 60. The valve mechanism shown for this purpose includes a valve casing 62 having a piston valve 63 reciprocally mounted therein. This valve comprises three pistons 64 having a close sliding fit within the bore of the valve casing 62 and rigidly connected by intermediate reduced portions 65 and 66, the position of the valve being determined by a valve stem 67 projecting through the end of the valve casing and connected with one of the end pistons 64. A passage 68 extending endwise of the valve maintains communication between the ends of the valve casing. A transverse passage 69 in the intermediate piston 64 is provided for communication with the feed pipe 61 when the valve is in the intermediate position of Figure 1. When in this position the fluid delivered from the pump through the feed pipe 61 passes through the passages 69 and 68 into the upper end of the valve casing and is returned to the sump 60 through the return pipe 70. Such is the position of the valve when the machine is at rest. The return pipe 70 is also provided with branch pipes 70' and 70² which enter the valve casing through ports which are covered by the end pistons 64 of the valve when in this position.

A pipe 71 connected with the upper portion of the valve casing effects communication between the valve casing and the lower ends of the cylinders 46 through the branch pipes 71' and 71² connected therewith. Another pipe 72 connected with the lower portion of the valve casing affords communication with the upper ends of the cylinders 46 through the branch pipes 72' and 72². These latter branch pipes are so connected with the cylinder heads 50 of these cylinders as to register with lateral ducts 73 formed in the upwardly extended portions 49 of the piston rods when the pistons are in their uppermost position.

A secondary valve mechanism carried by the lower cross-head 19 controls the application of fluid pressure to the upper and lower ends of the cylinder 31. In the form shown, this valve mechanism includes a valve casing 74 having a piston valve reciprocally mounted therein. This valve includes two pistons 75 having a close sliding fit within the bore of the valve casing and connected by a reduced portion 76, the position of this valve being controlled by a valve stem 77 connected therewith and projecting through an end of the valve casing 74. A passage 78 through this valve effects communication between the opposite ends of the valve casing. A pipe 79 is connected to the valve casing 74 adjacent one end thereof and to the end of the piston rod 48 through which communication is established with the passage 52 extending therethrough. A similar pipe 80 connected near the central portion of the valve casing 74 is connected at its other end with the lower end of piston rod 48' and in communication with the passage 55 therein. Communication between the upper end of the cylinder 31 and the valve casing 74 is effected through a pipe 81, a passage 82 through one of the connecting rods 21, and a pipe 83 connected with the valve casing adjacent one end thereof. Communication between the lower end of the cylinder 31 and valve casing is effected in a similar manner through a pipe 84, a passage 85 through the other connecting rod 21, and a pipe 86 connected with the valve casing adjacent the other end thereof.

Mechanism is provided for effecting an adjustment of the secondary valve mechanism at predetermined points in the path of travel of the cross-head 19. In this instance, adjustably fixed inclined cams 87 and 88 are provided for this purpose. These cams are arranged one above another in slightly offset relation on the face of a bracket plate 89 adjustably secured to a web 90 or other suitable portion of the main supporting frame. To effect a desired vertical adjustment, the bracket plate shown is provided with vertical slots 91 for receiving the clamp screws 92 threaded into the web 90. The inclined cams 87 and 88 are designed to cooperate with a cam roller 93 carried by the end of the valve stem 77 of the secondary valve mechanism to effect an adjustment of this valve mechanism in a manner to be later described.

In the machine shown, the valve stem 67 of the primary valve mechanism is connected through a link 94 with a lever 95 pivoted as at 96 upon a fixed bracket 97 secured to a leg 11 of the main supporting frame. A coiled spring 98 is connected at one end to the lever 95 and at the other end to sleeve 99 secured on a rod 100. Rod 100 is mounted in brackets 101 secured to the main supporting frame in such manner as to permit a limited lengthwise reciprocation of said rod therein. This rod carries upper and lower detents 102 and 103 adjustably secured thereto and positioned within the path of movement of the lug 104 carried by the lower cross-head 19. The arrangement is such that as the cross-head 19 approaches the upper limit of its stroke the lug 104 engages the upper detent 102 and lifts the rod 100. When the uppermost position is reached the spring 98 assumes a position such as that shown in Figure 1, in which position the spring tends to swing the lever 95 upwardly to shift the valve stem 67 and valve upwardly. An appropriate latch 105 is provided, however, for normally preventing an upward movement of the valve beyond the intermediate position shown in this figure. This latch normally depends freely from a pivot 106 and projects into the path of movement of the lever 95. When swung clear of the lever 95, however, the lever and valve move upwardly and the machine is started. Then as the cross-head 19 approaches the lower end of its travel, the lug 104 engages the lower detent 103, thus causing the rod 100 and spring 98 to be moved to the position shown in Figure 5, in which position the spring forces the lever 95 and valve stem 67 to their lowermost positions.

Provision is preferably made for permitting a free lateral movement of the work or tool during the working stroke in order to permit the one to automatically adjust itself to slight deviations of the other from correct working position or alignment during the working stroke and thus avoid objectionable side strains which might otherwise lead to inaccuracy of cutting or even to breakage of the tool. This may be accomplished in various ways, but in the machine shown the work support 15 constitutes a floating table so arranged as to permit the work to automatically adjust itself to any slight deviation of the tool from its normal path of the travel.

In this instance, the work support includes a block hollowed out to permit the passage of the tool therethrough and to receive the upper end of the sleeve 33 within the reduced end 14 thereof when the cross-head 19 is in its upper position, as shown in Figure 1. The block 15 is supported upon a plurality of anti-friction balls 17, interposed between the face of the bed plate 10 and an annular flange or shoulder 16 formed as an integral part of the block. Any appropirate means, such as screws 18, anchored in the bed plate and extending loosely through suitable openings 120 in the block, are employed to retain the block against upward movement. The balls 17 are maintained in proper working position by a suitable cage, preferably in the form of a ring 121 supported intermediate the shoulder 16 and bed plate 10, by means of upturned flanges 122 resting upon the balls. Lateral movement of the ring 121 is controlled by a plurality of locating pins 123 loosely mounted in upright position with their lower ends resting in sockets 124 within the face of the bed plate and their upper ends loosely engaging similar sockets 125 within the shoulder 16. The pins 123 extend through suitable openings 126 in the ring 121 so as to center the ring 121 and consequently the balls 17 when the table 15 is centered. A lateral movement of the table 15 in any direction will obviously cause a tilting of the several pins 123 so as to shift the ring one half the distance in the same direction thus permitting the natural rolling action of the balls with such movement. The openings in the ring through which the screws 18 extend are, of course, of sufficient size to permit such shifting of the ring.

Figure 1 illustrates the position of the various parts of the machine before beginning a broaching operation. The tool carrying frame, including the upper and lower cross-heads 19 and 20, and the connecting rods 21, are in their uppermost position. The weight of this frame is preferably counter-balanced by any appropriate means, such as weights 107 connected with the ends of the upper cross-head 20 through cables 108 passed over pulleys 109 mounted on fixed axes 110. The tool 13 depends from the socket 24 leaving a sufficient gap therebeneath to permit placing the work $a$ upon the work support 15. The primary valve mechanism is in the intermediate position hereinabove described.

To begin an active stroke of the machine the latch 105 is shifted by the operator to a releasing position, such as that shown in Figure 3. This permits the lever 95 to swing upwardly under the action of spring 98 to force the valve stem 67 and piston valve upwardly to the position shown in Figure 3. When this occurs, fluid pressure is transmitted from the feed pipe 61 around the reduced portion 65 of the piston valve to and through the pipe 72 and branch pipes 72′ and 72² into the passages 52 and 54 of the piston rods 48 and 48′, respectively. The fluid, preferably oil, entering the upper end of passage 52 transmits pressure through the passage 52, pipe 79, around the reduced portion 76 of the secondary valve, through the pipe 83, passage 82, and pipe 81 and into the upper end of the cylinder 31 where it is applied to the upper side of the piston 30. The piston 30 and plunger 23 then move downwardly advancing the nose of the tool through the work, into position between the open jaws 36 of the lower tool holder and into engagement with the head 41 of the cylinder 40, where it is held against further advance by the cylinder 40. This interruption in the movement of the tool, plunger 23 and piston 30 results in a building up of pressure in the upper end of the cylinder 31 and the rest of the fluid circuit. When the pressure in the pipes 72′ and 72² and passages 52 and 54 has increased sufficiently to lift the valves 57 against the pressure of their springs 58 the upper ends of the passages 52 and 54 are opened and fluid pressure is applied to the upper sides of the pistons 47 through the ducts 51. When this occurs, the pistons 47 begin their downward movement, as indicated in Figure 3, forcing the lower cross-head 19, together with the connecting rods 21 and upper cross-head 20, downwardly as a unit.

The cylinder 40 is restrained against downward movement, however, by the engagement of the friction clamp 44 with the fixed rod 45, so that as the sleeve 33 is carried downwardly by the cross-head 19 the chuck jaws 36 are forced inwardly to gripping position upon the nose of the tool. Thereafter, as the tool carrying frame, including the cross-heads 19 and 20, continues its downward movement the tool is advanced on its cutting stroke through the work, both by a pulling action exerted through the chuck jaws 36 and by a pushing action exerted through the plunger 23 under the fluid pressure above the piston 30.

During the downward movement of the tool and cross-heads 19 and 20 the fluid beneath the piston 30 is permitted to escape through the pipe 84, passage 85, pipe 86, across the valve casing 74, to and through the pipe 80, passage 55 and ducts 56 in the piston rod 48′ into the lower end of the cylinder 46. The fluid within the ends of the cylinders is permitted to escape through the branch pipes 71' and 71², respectively, and pipe 71, around the reduced portion 66 of the primary valve and into the branch pipe 70' from which it is returned to sump 60 through the pipe 70.

Figure 4:
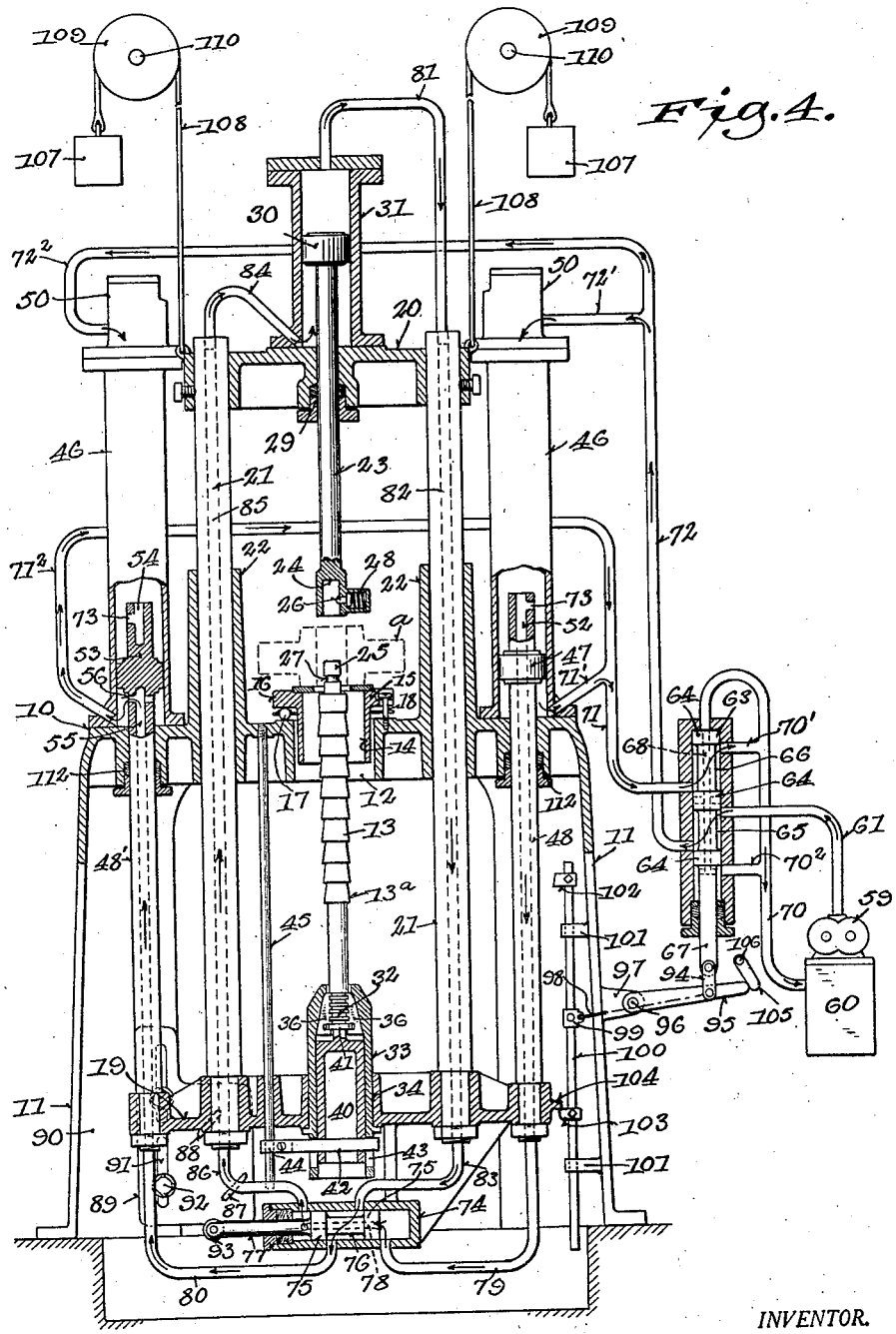

As the tool carrying frame, including the cross-head 19, reaches a predetermined point in its downward travel, the cam roller 93 engages the cam 87 and is forced to the left to the position shown in Figure 4. This is arranged to occur as the last teeth of the tool are passing through the work. When this occurs fluid from the pipe 79 enters the right end of the valve casing 74 and transmits pressure through the passage 78 in the valve, pipe 86, passage 85, and pipe 84 into the lower end of the cylinder 31 and beneath the piston 30. This causes the plunger 23 to rise pulling the socket 24 free of the tool 13. During this upward movement of the plunger 23 and piston 30, the fluid above the piston is permitted to escape through the pipe 81, passage 82, pipe 83, around the reduced portion 76 of the secondary valve, through pipe 80 to the lower end of cylinder 46 and thence back to the sump 60 in the manner hereinabove described.

Figure 5:
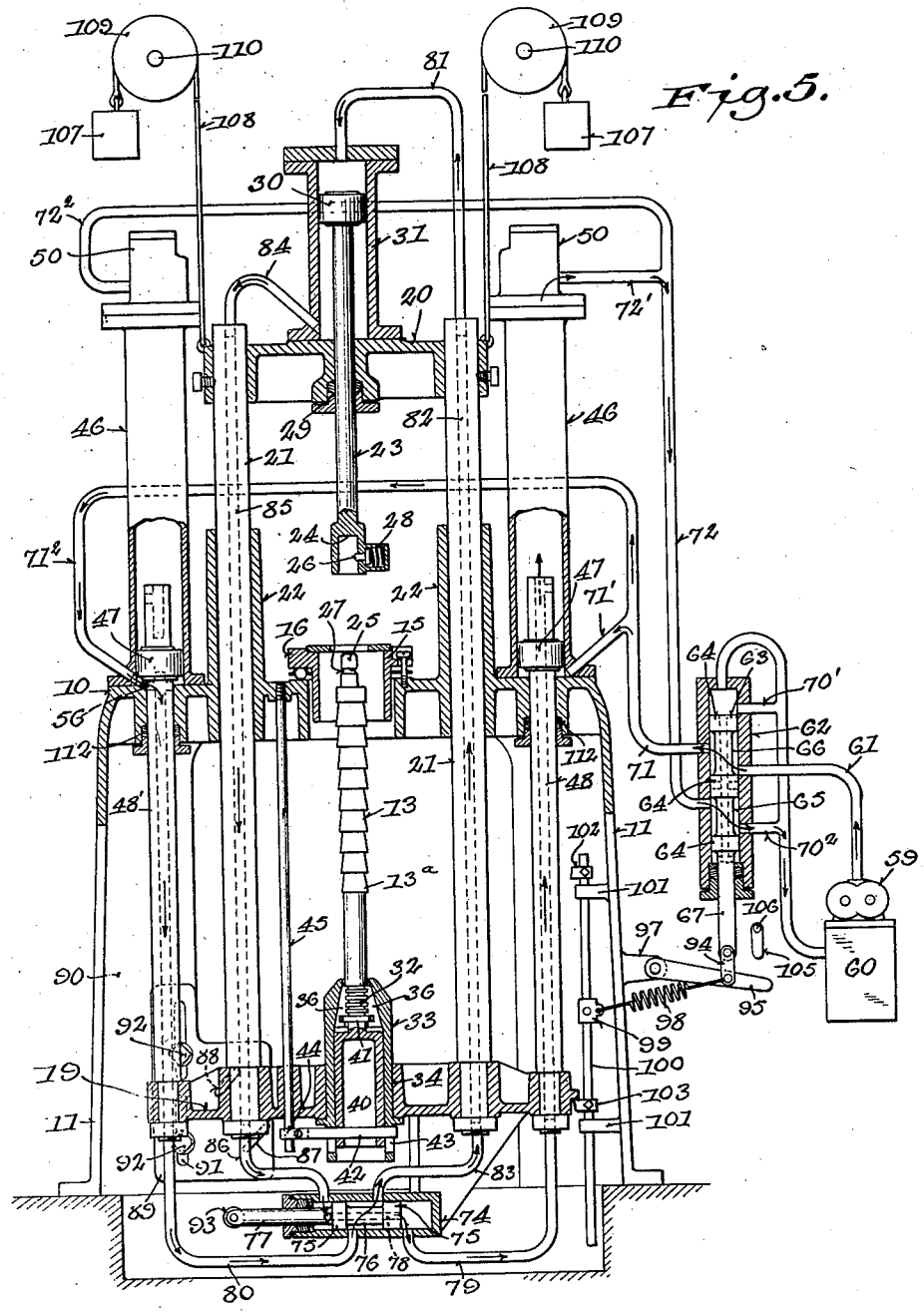

The chuck jaws 36 at this time, however, maintain a positive grip on the nose of the tool and, as the cross-head 19 continues its downward movement, these jaws lower the tool to a position clear of the work, as indicated in Figure 5. An unloading gap is thus provided between the upper end of the tool and the plunger 23 through which the work may be removed from the work support 15 at this time, either by hand or by appropriate automatic mechanism (not shown).

As the cross-head 19 approaches its lowermost position, shown in Figure 5, the lug 104 thereon engages the detent 103 so as to force the rod 100 and spring 98 downwardly. As above pointed out, this action causes the lever 95 to swing down quickly, under the tension in the spring 98, carrying with it the valve stem 67 and valve 63 to their lowermost position. Communication is thus established between the fluid feed pipe 61 and pipe 71 and between the branch pipe 70² and pipe 72. Fluid entering the pipe 71 transmits pressure through the branch pipes 71' and 71² into the lower ends of the cylinders 46 and beneath the pistons 47 to start these pistons on their upward stroke. At the same time fluid pressure is applied to the upper side of the piston 30 through the ducts 56, passage 55, pipe 80, pipe 83, passage 82, and pipe 81 to effect a downward movement of the piston 30 and plunger 23 toward the tool. The fluid beneath the piston 30 is permitted escape through pipe 84, passage 85, pipe 86, passage 78 in the secondary valve, pipe 79, and passage 52 through piston rod 48 into the upper end of cylinder 46; the fluid from the upper ends of pistons 46 escaping through the branch pipes 72' and 72², respectively, the pipe 72, branch pipe 70², and return pipe 70 back to the sump 60.

Figure 6:
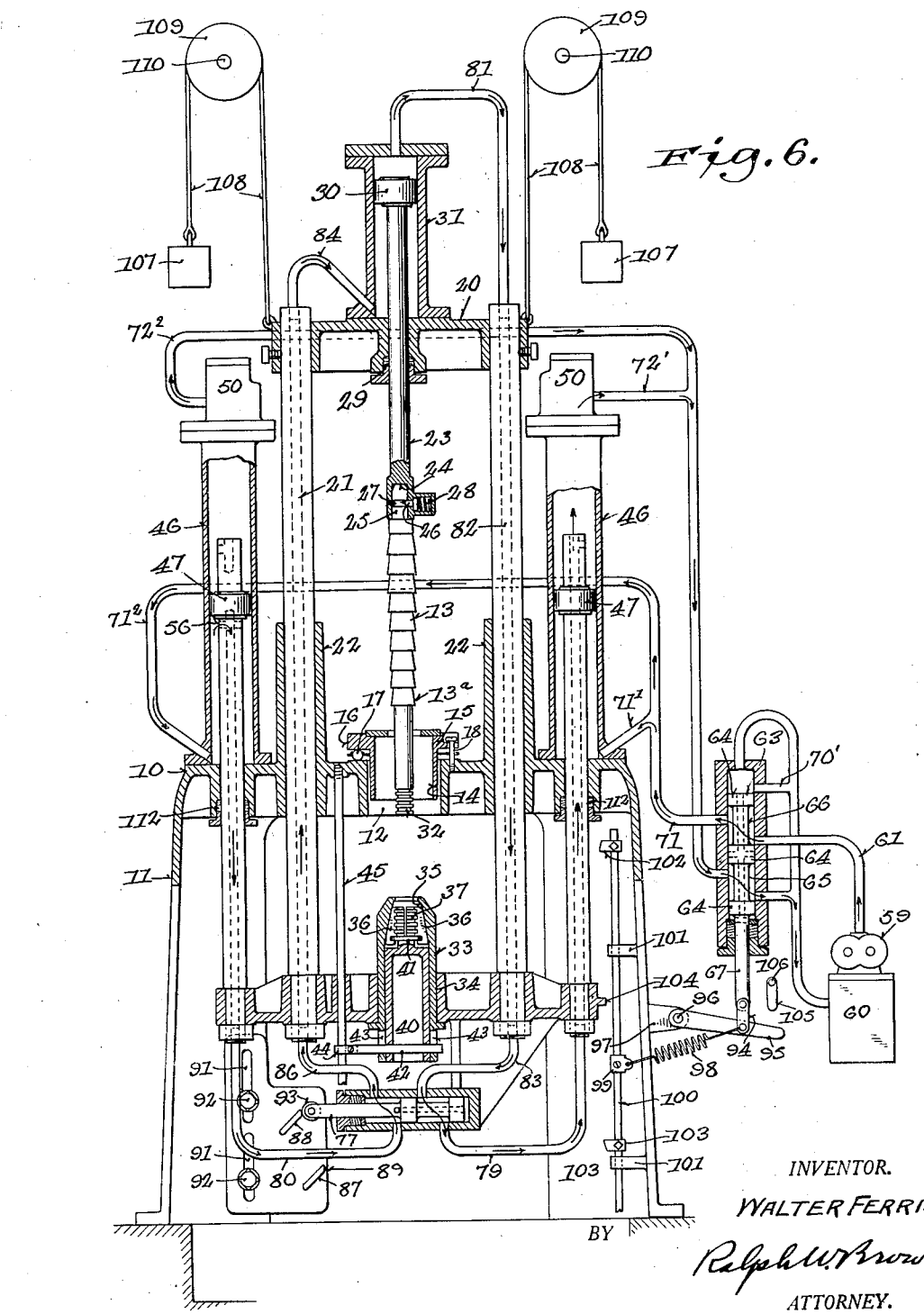

The work having been removed the tool is thus raised by the cross-head 19 until its upper end 25 is reengaged in the socket 24 carried by the downwardly moving plunger 23. When this occurs the cam roller 93 of the secondary valve mechanism engages the cam 88 and is shifted to the right, thereby returning the secondary valve to the position shown in Figure 6. Communication is thus established between the pipes 80 and 86, fluid pressure being thus applied below the piston 30, through passage 85 and pipe 84, communication being also established between pipes 83 and 79 to permit escape of fluid from the upper part of the cylinder 31.

At the beginning of the upward movement of the crosshead 19 the chuck jaws 36 are, of course, released from the lower end of the tool by the action of the cylinder 40, bar 42, clamp 44 and rod 45 in the manner heretofore explained, so that the tool is lifted clear of the chuck jaws by the upward movement of the cylinder 30 and plunger 23. Both the plunger 23 and cross-head 19 continue their upward movement until their uppermost positions (such as shown in Figure 1) are assumed.

As the cross-head 19 approaches the upper end of its stroke the lug 104 thereon engages the detent 102 and lifts the rod 100 and spring 98 to the position shown in Figure 1, thus causing the lever 95 to swing upwardly to its intermediate position against the latch 105, which has previously returned by gravity to its limiting position upon the previous downward movement of the lever 95. The primary valve 63 is thus returned to the intermediate position above described in which communication between the feed pipe 61 and pipes 71 and 72 is cut off. The machine remains in this position until a new piece of work has been mounted upon the work support 15 within the loading gap thus provided between the lower tool holder and the lower end or nose of the tool and until the latch 105 has again been shifted to the lever releasing position of Figure 3.

During the cycle of operations above described, it will be noted that before the crosshead 19 begins its downward movement on the working stroke the work support 15 is retained in centered position by the engagement of the sleeve 33 within the lower end 14 thereof. The initial engagement of the chuck jaws 36 upon the nose of the tool centers the tool and also insures a centering of the work upon the work support by the engagement of the tool within the work. After the cross-head 19 has moved downwardly sufficiently to release the sleeve 33 from the work support the work support is free to move laterally and thus permit the work to automatically adjust itself to any slight deviations of the tool from its normal path of travel during the working stroke. As the cross-head 19 approaches the upper limit of the return stroke the end of the sleeve 33 is reengaged within the end 14 of the work support so that the work support is again centered in readiness for the next cycle.

Thus it will be seen that a machine has been provided in which pressure, as well as tension, may be applied to the tool in effecting the required relative motion between the tool and work to effect the cutting stroke. The total working force may thus be considerably greater than that heretofore employed without danger of breaking the tool. It will be further noted that by the alternate production of loading and unloading gaps adjacent the opposite ends of the tool, a hand manipulation of the tool between working cycles is avoided.

Various changes may be made in the embodiment of the invention hereinabove described, without departing from or sacrificing any of the advantages of the invention as defined in the appended claims.

I claim:

1. A broaching machine, comprising a tool head having means for securing a broaching tool to one side thereof, a work support arranged upon the same side of said tool head for sustaining the pressure of the work, and power means arranged upon the same side of said tool head and alongside the path of said broaching tool for producing relative reciprocation between said tool head and said work support.

2. A broaching machine, comprising a work support having means upon one side thereof for sustaining the pressure of the work, a tool head arranged upon the other side of said work support and having means for securing a broaching tool to the side thereof toward said work support, and power means arranged upon the same side of said tool head and alongside the path of said broaching tool for producing relative reciprocation between said tool head and said work support.

3. A broaching machine, comprising a tool head having means for securing a broaching tool to one side thereof, a work support arranged upon the same side of said tool head for sustaining the pressure of the work, and two reciprocating hydraulic motors arranged upon the same side of said tool head and alongside the path of said broaching tool for producing relative reciprocation between said tool head and said work support.

4. A broaching machine, comprising a work support having means upon one side thereof for sustaining the pressure of the work, a tool head arranged upon the other side of said work support and having means for securing a broaching tool to the side thereof toward said work support, and two reciprocating hydraulic motors arranged upon the same side of said tool head and alongside the path of said broaching tool for producing relative reciprocation between said tool head and said work support.

5. A broaching machine, comprising a work support for sustaining the pressure of the work, a tool head arranged upon one side of said work support for reciprocation toward and from the same, means carried by said tool head for securing a broaching tool thereto upon the side thereof toward said work support, power means arranged alongside the path of said tool and connected to said tool head upon the same side as said tool for reciprocating said tool head and passing said tool through said work support and the work supported thereon.

6. A broaching machine, comprising a work support having means upon one side thereof for sustaining the pressure of the work, a tool head arranged upon the other side of said work support for reciprocation toward and from the same, means carried by said tool head for securing a broaching tool thereto upon the side thereof toward said work support, power means arranged alongside the path of said tool and connected to said tool head upon the same side as said tool for reciprocating said tool head and passing said tool through said work support and the work supported thereon.

7. A broaching machine, comprising a work support for sustaining the pressure of the work, a tool head arranged upon one side of said work support for reciprocation toward and from the same, means carried by said tool head for securing a broaching tool thereto upon the side thereof toward said work support, a reciprocating hydraulic motor arranged alongside the path of said tool and having its piston connected to said tool head upon the same side as said tool for reciprocating said tool head and passing said tool through said work support and the work supported thereon.

8. A broaching machine, comprising a work support having means upon one side thereof for sustaining the pressure of the work, a tool head arranged upon the other side of said work support for reciprocation toward and from the same, means carried by said tool head for securing a broaching tool thereto upon the side thereof toward said work support, a reciprocating hydraulic motor arranged alongside the path of said tool and having its piston connected to said tool head upon the same side as said tool for reciprocating said tool head and passing said tool through said work support and the work supported thereon.

9. A broaching machine, comprising a work support for sustaining the pressure of the work, a tool head arranged upon one side of said work support for reciprocation toward and from the same, means carried by said tool head intermediate the ends thereof for securing a broaching tool thereto upon the side thereof toward said work support, a reciprocating hydraulic motor arranged alongside the path of said tool upon each side thereof and having its piston connected to said tool head upon the same side as said tool for reciprocating said tool head and passing said tool through said work support and the work supported thereon.

10. A broaching machine, comprising a work support having means upon one side thereof for sustaining the pressure of the work, a tool head arranged upon the other side of said work support for reciprocation toward and from the same, means carried by said tool head intermediate the ends thereof for securing a broaching tool thereto upon the side thereof toward said work support, a reciprocating hydraulic motor arranged alongside the path of said tool upon each side thereof and having its piston connected to said tool head upon the same side as said tool for reciprocating said tool head and passing said tool through said work support and the work supported thereon.

11. A vertical broaching machine, comprising a work support for sustaining the pressure of the work, a tool head arranged below said work support and having means for connecting a broaching tool to the upper side thereof, and power means arranged alongside said tool above said tool head and connected to said tool head for reciprocating it toward and from said work support.

12. A vertical broaching machine, comprising a work support having means upon its upper side for sustaining the pressure of the work, a tool head arranged below said work support and having means for connecting a broaching tool to the upper side thereof, and power means arranged alongside the path of said tool above said tool head and connected to said tool head for reciprocating it toward and from said work support.

13. A vertical broaching machine, comprising a work support for sustaining the pressure of the work, a tool head arranged below said work support and having means for connecting a broaching tool to the upper side thereof, and a reciprocating hydraulic motor arranged alongside the path of said tool above said tool head and having its piston connected to said tool head for reciprocating it toward and from said work support.

14. A vertical broaching machine, comprising a work support, a cylinder arranged near the end of said work support, a tool head arranged below said work support and said cylinder, a piston fitted in said cylinder and having its rod connected to said tool head, means for delivering driving liquid to said cylinder to reciprocate said piston and thereby reciprocate said tool head toward and from said work support, and means carried by said tool head for securing a tool to the upper side thereof whereby the path of said tool is substantially coextensive with the path of said piston rod.

15. A vertical broaching machine, comprising a work support, a cylinder arranged near each end of said work support, a tool head arranged below said work support and said cylinders, pistons fitted in said cylinders and having the rods thereof connected to said tool head, means for delivering driving liquid to said cylinders to reciprocate said pistons and thereby reciprocate said tool head toward and from said work support, and means arranged between said piston rods and carried by said tool head for securing a tool to the upper side thereof whereby the path of said tool is substantially coextensive with the paths of said piston rods.

16. In a broaching machine, the combination of a crosshead, tool engaging means on one side thereof, and hydraulic means for actuating said crosshead comprising a plurality of piston and cylinder assemblies disposed at the same side of said croshead as said tool engaging means.

17. In a broaching machine, the combination of a crosshead, tool engaging means on one side thereof, and hydraulic means for actuating said crosshead comprising a piston and cylinder connected with each end of said crosshead and disposed at the same side thereof as said tool engaging means.

18. In a broaching machine, the combination of a tool pulling member, means for effecting a pulling connection between said member and tool, and hydraulically actuated means for pushing said member to thereby pull the tool through a cutting stroke.

19. In a broaching machine, the combination of a tool pulling member, means for effecting a pulling connection between said member and tool, and means including a pair of pushing cylinders disposed at opposite sides of said means and operable on said member to pull the tool through a cutting stroke.

20. In a broaching machine, the combination of a face plate for supporting the work, a tool head for carrying a broaching tool, power means for producing relative reciprocation between said tool head and said face plate to pass said tool through said face plate, and means for withdrawing said tool from said tool head and moving it beyond said face plate to provide a clear gap between the end of said tool and said face plate.

21. In a broaching machine, the combination of a face plate for supporting the work, a tool head for carrying a broaching tool, power means for reciprocating said tool head to pass said tool through said face plate, and means for withdrawing said tool from said tool head and moving it beyond said face plate to provide a clear gap between the end of said tool and said face plate.

22. In a broaching machine, the combination of a face plate for supporting the work, a tool head for carrying a broaching tool, power means for reciprocating said tool head to pass said tool through said face plate, and means actuated in response to the movement of said tool head for withdrawing said tool from said tool head and moving it beyond said face plate to provide a clear gap between the end of said tool and said face plate.

23. A vertical broaching machine, comprising a face plate for supporting the work upon the upper side thereof, a tool head arranged below said face plate and having means for securing a broaching tool thereto, a tool shifter arranged above said face plate and having means to grip said tool, means for actuating said tool shifter to raise said tool until its lower end is clear of said face plate to provide a loading gap for the free insertion of work laterally upon said face plate and to lower said tool into engagement with said tool head, and power means for producing relative reciprocation between said tool head and said face plate to pass said tool through work supported upon said face plate until its upper end is clear of the upper side of said face plate to provide an unloading gap for the free removal of work laterally from said face plate.

24. A vertical broaching machine, comprising a face plate for supporting the work upon the upper side thereof, a tool head arranged below said face plate and having means for securing a broaching tool thereto, a tool shifter arranged above said face plate and having means to grip said tool, means for actuating said tool shifter to raise said tool until its lower end is clear of said face plate to provide a loading gap for the free insertion of work laterally upon said face plate and to lower said tool into engagement with said tool head, and power means arranged above said tool head for producing relative reciprocation between said tool head and said face plate to pass said tool through work supported upon said face plate until its upper end is clear of the upper side of said face plate to provide an unloading gap for the free removal of work laterally from said face plate.

25. A vertical broaching machine, comprising a face plate for supporting the work upon the upper side thereof, a tool head arranged below said face plate and having means for securing a broaching tool thereto, a tool shifter arranged above said face plate and having means to grip said tool, means for actuating said tool shifter to raise said tool until its lower end is clear of said face plate to provide a loading gap for the free insertion of work laterally upon said face plate and to lower said tool into engagement with said tool head, and a hydraulic motor arranged upon each side of said broaching tool and above said tool head for producing relative reciprocation between said tool head and said face plate to pass said tool through work supported upon said face plate until its upper end is clear of the upper side of said face plate to provide an unloading gap for the free removal of work laterally from said face plate.

26. A vertical broaching machine, comprising a face plate for supporting the work upon the upper side thereof, a tool head arranged below said face plate and having means for securing a broaching tool thereto, a tool shifter arranged above said face plate and having means to grip said tool, means for actuating said tool shifter to raise said tool until its lower end is clear of said face plate to provide a loading gap for the free insertion of work laterally upon said face plate and to lower said tool into engagement with said tool head, and two hydraulic motors arranged above said tool head and connected thereto upon opposite sides of said tool for reciprocating said tool head toward and from said face plate and for lowering said tool until its upper end is clear of the upper side of said face plate to provide an unloading gap for the free removal of work laterally from said face plate.

27. In a broaching machine, the combination of a support for sustaining the thrust of the work, means for supporting a broaching tool with the nose thereof spaced from said support to permit insertion of a work piece therebetween, a tool pulling member, said work support being disposed between said tool supporting means and said pulling member, means for actuating said tool support to advance the nose of the tool through said work support into engagement with said pulling member, means automatically operable to effect a pulling connection between said pulling member and tool, and means for actuating said pulling member to force the tool through the work.

28. In a broaching machine, the combination of a tool carrying frame, tool pulling means carried thereby, tool pushing means carried thereby, means for reciprocating said frame to thereby simultaneously pull and push the tool through the work, and means controlled by movement of said frame for controlling the operation of said pushing and pulling means.

29. In a broaching machine, the combination of a tool carrying frame, tool pulling means carried thereby, tool pushing means carried thereby, means for reciprocating said frame to simultaneously push and pull the tool through the work, and means for effecting relative movement between said pushing and pulling means to release the tool.

30. In a broaching machine, the combination of a tool carrying frame, tool pulling means carried thereby, tool pushing means carried thereby, and hydraulic means for reciprocating said frame to simultaneously push and pull the tool through the work and for effecting relative movement of said tool pushing means and frame to release the tool.

31. In a broaching machine, the combination of a work support, a broach pulling member engageable with one end of a broach, a broach pushing member engageable with the other end of the broach, power driven means for producing relative movement between said support and members to thereby simultaneously pull and push the broach through the work, control means automatically operable to predetermine the extent of such movement, and control means automatically operable to effect separation of said members from the broach alternately.

32. In a broaching machine, the combination of two members engageable with the opposite ends of a broach, means for effecting a positive pulling connection between one of said members and a broach, means automatically operable to release said connection, a yieldable connection between the other of said members and the broach, a work support, and power driven means for producing relative movement between said support and members to thereby force the broach through the work and for effecting relative movement between said members to automatically separate the same from the opposite ends of the broach alternately.

In witness whereof, I hereunto subscribe my name this 15th day of March, 1922.

WALTER FERRIS.

CERTIFICATE OF CORRECTION.

Patent No. 1,823,975.             Granted September 22, 1931, to

WALTER FERRIS.

It is hereby certified that error appears in the printed specification of the above numbered patent requiring correction as follows: Page 1, after line 39, insert Another object is to provide a machine of this character which is operated hydraulically.

Other objects and advantages will appear hereinafter.

According to the invention in its principal aspect, the path of the broaching tool is arranged alongside the power means.

According to another aspect of the invention, power is applied to both ends of the tool simultaneously during a cutting stroke.

According to another aspect of the invention, the end of the tool is disengaged and moved beyond the bearing surface of the face plate at each end of each stroke to allow work to be moved freely into and out of position to be broached.

A vertical broaching machine embodying the invention is illustrated in the accompanying drawings in which the views are as follows:

Fig. 1 is a central vertical section which is somewhat diagrammatic in character and shows the machine at rest.

Fig. 2 is a central vertical section through the tool holder shown in Fig. 1.

Same page, line 43, beginning with the word "Figure" strike out all to and including the word and numeral "Figure 1" in line 50; line 54, for "operations" read operation; page 5, line 58, after "pipe 80, insert valve 74; and that the said Letters Patent should be read with these corrections therein that the same may conform to the record of the case in the Patent Office.

Signed and sealed this 8th day of December, A. D. 1931.

(Seal)                                        M. J. Moore,
Acting Commissioner of Patents.